United States Patent [19]

Bedére et al.

[11] Patent Number: 4,481,180

[45] Date of Patent: Nov. 6, 1984

[54] DIAMOND SYNTHESIS PROCESS

[75] Inventors: Serge Bedére, Chalo sur Mars; Jean-Phillippe Borgoltz, Saint Germain les Arpajon; Claude Moussin, Velizy Villacoublay, all of France

[73] Assignee: Commissariat A l'Energie Atomique, Paris, France

[21] Appl. No.: 464,784

[22] Filed: Feb. 9, 1983

Related U.S. Application Data

[63] Continuation of Ser. No. 265,248, May 19, 1981, abandoned.

[30] Foreign Application Priority Data

May 29, 1980 [FR] France ............................... 80 11942

[51] Int. Cl.³ ............................................. C01B 31/06
[52] U.S. Cl. ...................................... 423/446; 425/77
[58] Field of Search ......................................... 423/446

[56] References Cited

U.S. PATENT DOCUMENTS 2,947,609  8/1960  Strong .................................. 423/446
2,992,900  7/1961  Bovenkerk ........................... 423/446

FOREIGN PATENT DOCUMENTS 47-13406  4/1972  Japan ................................... 423/446

Primary Examiner—Edward J. Meros
Attorney, Agent, or Firm—Oblon, Fisher, Spivak, McClelland & Maier

[57] ABSTRACT

The present invention relates to a diamond synthesis process.

A stack of graphite and alloy pellets of at least one metal of group VIII or VII of the periodic system with an element having the same crystallographic structure as the diamond are placed in an enclosure. The pressure and temperature are raised so that the alloy starts to liquefy. Part of the element remains in the state of solid particles used in the nucleation by epitaxy of the diamond crystals. The carbon migrates through the liquid alloy from the pellets to the solid particles.

7 Claims, 1 Drawing Figure

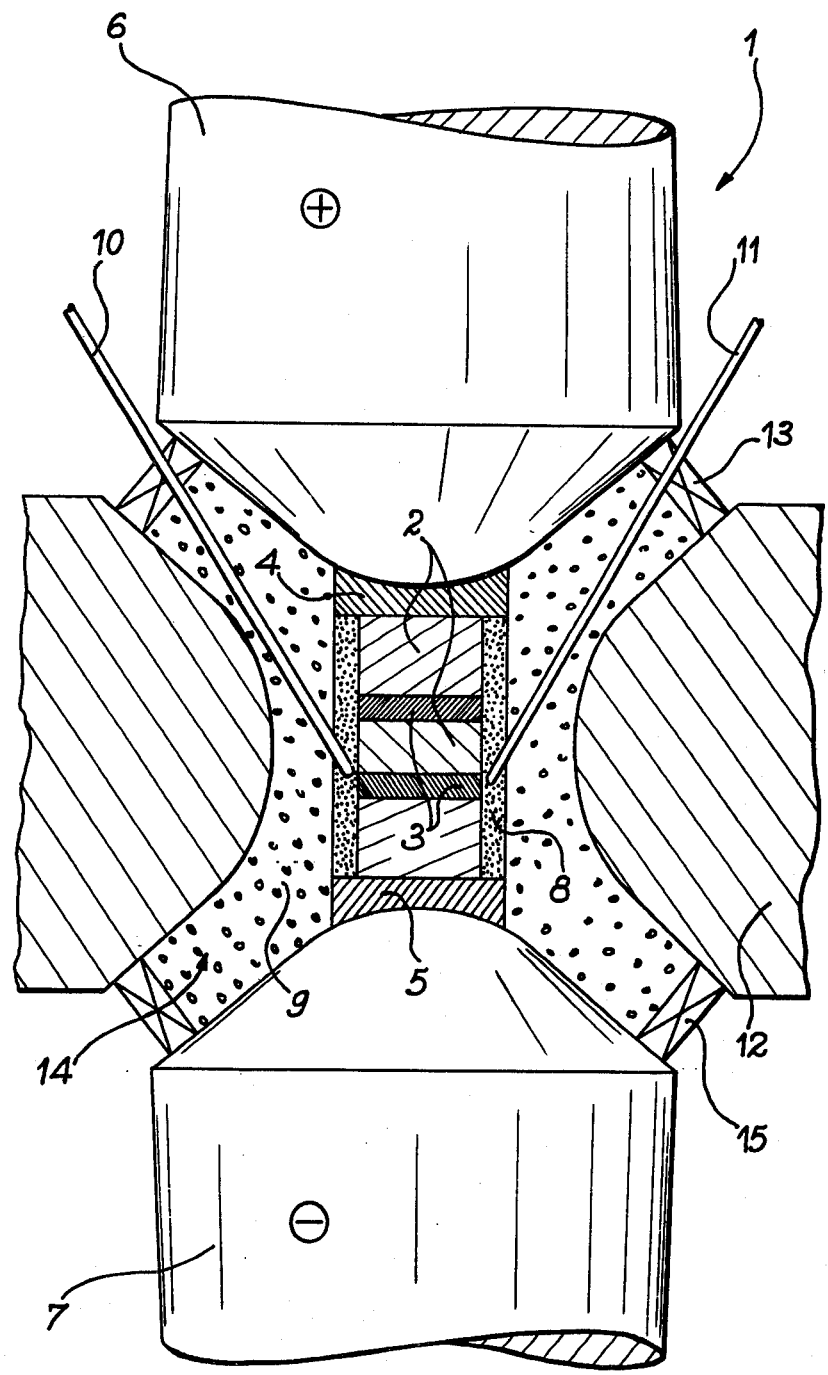

DIAMOND SYNTHESIS PROCESS

This is a continuation of application Ser. No. 265,248, filed May 19, 1981.

The present invention relates to a process and to an apparatus for the synthesis of diamond.

A known process consists of using a catalyst solvent which, brought into the liquid state, dissolves the graphite under adequate temperature and pressure conditions. The presently used catalyst solvents are metals of group VIII of the periodic system or alloys of said metals.

Through the use of such catalyst solvents it is necessary to operate at high temperatures of approximately 1000° to 2500° C. and consequently at high pressures (approximately 50 to 90 kilobars), representing severe operating conditions for high pressure enclosures.

Another known process makes it possible to work under much less severe conditions (400° to 700° C., 10 to 20 kbar), but it uses as the starting product compounds of carbon and fluorine which react with metals such as aluminium, magnesium or nickel. In most cases a mixture of particles of pure diamond and fluorinated diamond is obtained, instead of pure diamond alone. Moreover, in addition, the rise times and temperature and pressure maintaining times are relatively long (maintaining time approximately 1 to 72 hours).

The present invention relates to a process and an apparatus obviating the aforementioned disadvantages, whilst making it possible to obtain pure diamond in a relatively short time, whilst working in temperature and pressure ranges which in no way endanger the installations.

The present invention therefore relates to a process for the synthesis of diamond comprising placing in a high pressure enclosure a stack of graphite pellets and a catalyst material, wherein the latter is an alloy of at least one metal of group VII or VIII of the periodic system with an element having the same crystallographic structure as the diamond and wherein it comprises increasing the pressure in the enclosure and then the temperature until the alloy starts to liquefy, at least part of the said element being in the form of solid particles within the liquid mass, maintaining the temperature and pressure conditions for a sufficient time for the graphite to be changed into diamond, the carbon migrating through the liquefied alloy from the pellets to the aforementioned solid particles on which it is deposited and crystallizes by epitaxy in the diamond system and then returning to the initial conditions.

The metals used in the composition of the alloy are preferably chosen from the group including iron, cobalt, nickel, platinum and manganese and the alloy may optionally be a ternary or quanternary alloy. The element having the same crystallographic structure as diamond can be germanium or silicon, which are very suitable within the scope of the present invention.

The use of such alloys offers numerous advantages. Firstly they form eutectics in the temperature range between 800° and 1200° C., which are sufficiently high to obtain at least a liquid film of the catalyst material necessary for carrying out the synthesis. Moreover through working in this relatively low temperature range it is possible to use average pressures of approximately 30 to 60 kilobars, so that the high pressure enclosures are not exposed to too severe operating conditions.

Finally if the alloy composition remains close to that of the eutectic the element having the same crystallographic structure as the diamond at least partly remains in the state of solid particles within the liquefied alloy mass. These particles act as nuclei for the crystallization, by epitaxy, of the carbon in the diamond system. Thus, the carbon atoms migrate through the liquefied alloy from the graphite pellets to the said particles, where they are deposited and cyrstallize in the same system as the latter.

The present invention also relates to an apparatus for performing the aforementioned process.

This apparatus comprises an annular enclosure generating high pressures, said enclosure incorporating an intermediate ring and two pistons defining a confinement area and means for heating by the Joule effect the stack of graphite and alloy pellets as a result of the electric current passing through the said stack, the current passing through the two pistons, wherein the stack of pellets is surrounded by a boron nitride sheath insulating it from the pyrophyllite pressure transmitting medium, sealing being ensured by Teflon joints, and wherein it comprises two rectilinear thermocouples successively traversing from the outside to the inside the Teflon joints and the pressure transmitting medium before reaching the boron nitride sheath.

Finally the invention also relates to the products obtained by the aforementioned process.

According to the characteristic principle of these products, they are diamond crystals having a content of impurities below 100 parts per million.

The invention will be better understood and the performance of the process will be clearer as a result of the following description of an illustrative and non-limitative embodiment with reference to the attached drawing which is a diagrammatic sectional view of the stack of graphite and alloy pellets placed in the high pressure enclosure used for the synthesis.

The latter can, for example, be the high pressure enclosure described in French Pat. No. 1 457 690 of Sept. 23, 1965, supplemented by addition 89 399 of Jan. 14, 1969 belonging to the present applicant and which is very suitable for use within the scope of the present invention.

The drawing shows in an enclosure 1 a stack of cylindrical pellets alternately of graphite 2 and a nickel-germanium alloy 3. The latter has a eutectic appearing at 775° C. for a composition of 67% by weight germanium and 33% by weight nickel, but the eutectic composition is not imperative. In the case of nickel-germanium it is possible to use alloys in which the germanium weight percentage is between 20 and 90. It is also possible to dope the alloy with elements such as copper, the weight percentage of the latter remaining below 10%. The graphite on the one hand and the alloy on the other can either be in the form of a previously compacted powder or in the form of machined solid disks or in the form of a combination thereof, e.g. solid graphite and pulverulent nickel-germanium.

The stack is pressurized by means of the two pistons 6 and 7. These pistons and an intermediate ring 12 define a confinement area 14 filled with pyrophyllite constituting a pressure transmitting medium 9, whilst two high pressure Teflon joints 13, 15 seal the confinement area 14. The temperature rise can take place by the Joule effect, because the materials forming the stack are good electrical conductors. In this case two tantalum disks 4, 5 conforming to the shape of pistons 6, 7 respectively are placed at the ends of the stack in order to ensure the passage of the current. In the present embodiment direct current is used and is supplied through pistons 6, 7. However, it is possible to use either alternating current or direct current, but the latter has the advantage of bringing about an electrolytic effect in the alloy pellets. The diamond crystals tend to form in the vicinity of one face of the said pellets, which facilitates the recovery thereof.

A boron nitride sheath 8 insulates the graphite pellets 2 and alloy pellets 3 from the pressure transmitting medium 9, which can be of pyrophyllite. The sheath essentially serves to protect the stack of pellets 2, 3 from the silicates which may form in the pyrophyllite when the latter is exposed to high pressures and temperatures. There is a risk of said silicates passing into the alloy and thereby making it more difficult to extract the diamond crystals. Two thermocouples 10, 11 make it possible to follow the temperature progression. The rectilinear thermocouples successively traverse joint 13, pressure transmitting medium 9 and sheath 8, but do not come into contact with pellets 2 and 3. The rectilinear shape of these thermocouples makes it possible for them to resist the high pressures within the pyrophyllite mass.

An example of an operating cycle can start at ambient temperature, followed by a pressure rise at a rate of 0.4 kbar/minute to a maximum value of 50 kbar, a temperature rise at a rate of 60° C./minute to 900° C. and then these synthesis conditions are maintained for 15 minutes.

It is obvious that the conditions of this operating cycle are only given for illustrative purposes and it is possible to vary them without passing beyond the scope of the invention. For example the temperature rise rate can vary between 10° and 150° C./minute, whilst it is maintained for between 3 minutes and 2 hours. The temperature at which synthesis is performed can vary between 30 and 60 kbar. However, all these conditions can be adjusted as a function of the size and the optical and mechanical qualities sought for the crystals. Moreover, it is possible to use alternating current for heating the stack of pellets.

Another test was carried out using as the catalyst an alloy of nickel and germanium containing 67% by weight of nickel. This test started at ambient temperature, followed by a pressure rise at a rate of 0.38 kbar/minute to a value of approximately 55 kbar, a temperature rise at a rate of 20° C./minute to 1200° C., the maintainance of these synthesis conditions for a few minutes and then heating was stopped and the pressure reduced to 55 to 40 kbar.

The diamond was identified by X-ray diffraction revealing three main peaks of the diamond corresponding to the crystallographic planes (111), (220) and (311) of the cubic diamond.

The interplanar crystal spacings measured are compared with the ASTM spacings in the following table:

| hkl | d (ASTM) hkl (Å) | d measured hkl (Å) |
| --- | --- | --- |
| 111 | 2.059 | 2.062 |
| 220 | 1.261 | 1.263 |
| 311 | 1.075 | 1.077 |

It is therefore apparent that the present process offers numerous advantages. It makes it possible to work at relatively low temperatures (800°/1200° C.) and at sufficiently low pressures (30 to 60 kbars) to ensure that the enclosures used for carrying out the synthesis are not exposed to too severe operating conditions. Finally an operation lasts a relatively short time, because the temperature and pressure rise times do not exceed two hours. The process leads to relatively pure diamond crystals because the impurity content does not exceed 100 p.p.m, so that they have good optical qualities and a very satisfactory mechanical strength. The size of the crystals is approximately 10 to 100 micrometers.

The process can be used in the production of artificial diamonds of different sizes and with different optical and mechanical qualities.

We claim:

1. A process for the synthesis of diamond, comprising:
   placing in a high pressure enclosure a stack of graphite pellets and a catalyst material, wherein said catalyst material is a eutectic alloy of at least one metal of group VII or VIII of the periodic system with an element having the same crystallographic structure as the diamond selected from the group consisting of germanium and silicon;
   increasing the pressure in the enclosure to a pressure ranging from 30 to 60 kilobars and then the temperature to within the range of 800° C. to 1200° C. until the alloy starts to liquefy, at least part of the said element being in the form of solid particles within the liquid mass;
   maintaining the temperature and pressure conditions for a sufficient time for the graphite to be changed into diamond, the carbon migrating through the liquefied alloy from the pellets to the aforementioned solid particles on which it is deposited and crystallized by epitaxy in the diamond system; and then returning to the initial conditions.

2. A process according to claim 1, wherein the graphite and/or alloy is in the form of a previously compacted powder.

3. A process according to claim 1, wherein the alloy is a ternary or quaternary alloy which also comprises, in addition to the element having the same crystallographic structure as the diamond, at least two metals selected from the group consisting of iron, cobalt, nickel, manganese and platinum.

4. A process according to claim 1, wherein the pressure rise takes place at a rate of approximately 0.4 kilobars/minute.

5. A process according to claim 1, wherein the temperature rise takes place at a rate between 10° and 150° C./minute.

6. A process according to claim 1 wherein the pressure and temperature maintainance time is between 3 minutes and 2 hours.

7. The process according to claim 5, wherein the temperature rise takes place at a rate of 60° C./minute.

* * * * *